United States Patent Office 3,365,393
Patented Jan. 23, 1968

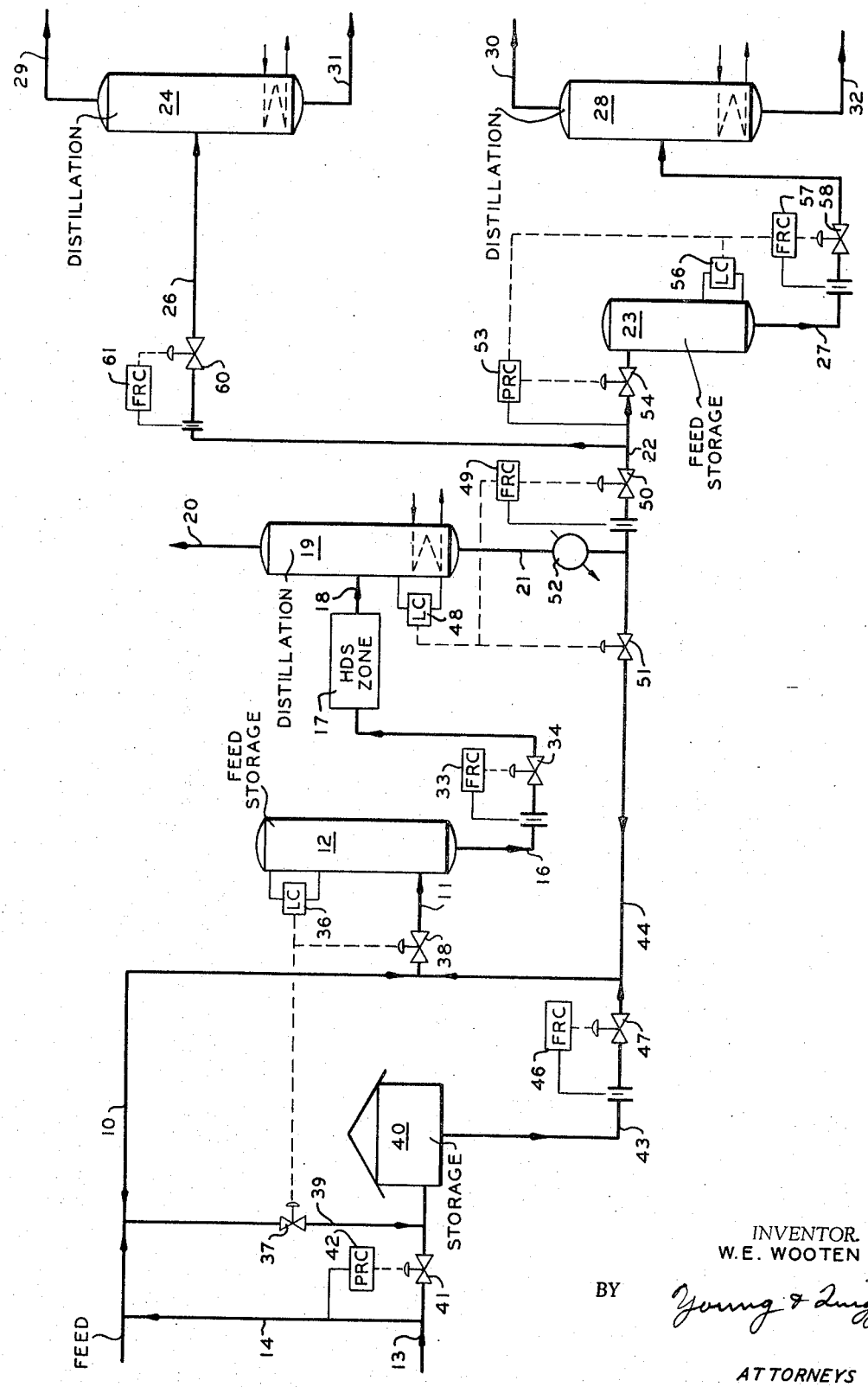

3,365,393
PROCESS CONTROL SYSTEM
William E. Wooten, Bartlesville, Okla., assignor to Phillips Petroleum Company, a corporation of Delaware
Filed Apr. 2, 1964, Ser. No. 356,738
12 Claims. (Cl. 208—212)

ABSTRACT OF THE DISCLOSURE

When the total feed input to a surge tank causes the liquid level to rise above a desired level, a portion of the feed can be passed to a by-pass storage tank at a flow rate responsive to the liquid level in the surge tank. The flow rate of total feed to the surge tank can be manipulated responsive to the liquid level in the surge tank. Feed can be passed from the surge tank through a reaction zone to a first distillation column. The flow rate of kettle product from the distillation column can be manipulated responsive to the liquid level in the distillation column and a portion of the liquid from the distillation column can be recycled to the surge tank at a flow rate responsive to the extent the liquid level in the distillation column exceeds a predetermined value. A first portion of the kettle product can be passed to a second distillation column while a second portion can be passed through a second surge tank to a third distillation column. The flow rate of material from the second surge tank and the pressure upstream of the second surge tank can be manipulated responsive to the liquid level in the second surge tank.

Background of the invention

This invention relates to a method of controlling a process and apparatus therefor. In another aspect, this invention relates to a method of and apparatus for controlling a process wherein process stream flow rates are variable. In yet another aspect, this invention relates to a method of and apparatus for controlling a hydrodesulfurization process.

A process comprising multiple process steps and wherein the rate of flow of feed to the process and intermediate process stream flow rates vary widely is difficult to control. This difficulty is further increased when the rate of flow of feed to one or more of the process steps must be maintained substantially constant.

Accordingly, an object of my invention is to provide an improved process control method and apparatus therefor.

Another object of my invention is to provide a process control method and apparatus therefor wherein the rate of flow of feed to or from at least one of the process steps is variable.

Another object of my invention is to provide a method and apparatus for controlling a hydrodesulfurization process.

Other objects, advantages and features of my invention will be readily apparent to those skilled in the art from the following description, the drawing and appended claims.

By my invention I have provided a control system wherein the rate of flow of a liquid feed to a liquid feed storage zone and a by-pass storage zone is manipulated responsive to a liquid level within said feed storage zone; the rate of flow of feed from said feed storage zone to a reaction zone is maintained substantially constant; effluent is passed from said reaction zone to a distillation zone; a liquid product is withdrawn from said distillation zone responsive to the liquid level within said distillation zone; and liquid is passed from said distillation zone to said feed storage zone and said by-pass storage zone responsive to said liquid levels in said distillation zone and said feed storage zone.

Brief description of the drawing

The drawing is a schematic representation of one embodiment of the invention.

Description of the preferred embodiment

A better understanding of the invention can be obtained by referring to the drawing. Although not to be limited thereto, the inventive control system will hereinafter be described as applied to the control of a hydrodesulfurization process.

A $C_6$ and heavier straight run gasoline feed is passed via conduit means 10 and conduit means 11 to feed storage vessel 12. Additional $C_6$ and heavier straight run gasoline feed is introduced into feed storage vessel 12 via conduit means 13, conduit means 14, conduit means 10, and conduit means 11. Liquid straight run gasoline is withdrawn from feed storage vessel 12 via conduit means 16 and passed to a hydrodesulfurization zone 17.

Within hydrodesulfurization zone 17, the hydrocarbon feed is desulfurized by typically contacting the hydrocarbon feed in the vapor phase and in the presence of hydrogen with a cobalt-molybdenum-containing catalyst fixed bed at a temperature of 670° F. and a pressure of 220 p.s.i.g. With the rate of feed of straight run gasoline of 28,600 barrels per day to hydrodesulfurization zone 17, the volume of the fixed bed maintained within hydrodesulfurization zone 17 can be about 1670 cubic feet.

Hydrogen is separated from the effluent withdrawn from the hydrodesulfurization zone and a hydrogen-free liquid effluent is passed from hydrodesulfurization zone 17 via conduit means 18 to a distillation column 19. Within distillation column 19, the feed is separated into a vaporous fraction comprising hydrogen sulfide, $C_5$ and lighter hydrocarbons which are withdrawn from distillation column 19 via conduit means 20 and a desulfurized straight run gasoline fraction withdrawn from distillation column 19 via conduit means 21. Distillation column 19 can typically be operated at a top temperature of 210° F., a top pressure of 85 p.s.i.g., a bottom temperature of 305° F., and a bottom pressure of 87 p.s.i.g.

The desulfurized straight run gasoline fraction withdrawn from distillation column 19 via conduit means 21 is passed via conduit means 22 to feed storage vessel 23 and to distillation column 24 via conduit means 22 and 26. Straight run gasoline stored within feed storage vessel 23 is withdrawn from storage vessel 23 via conduit means 27 and passed to distillation column 28. Within distillation columns 24 and 28, the straight run gasoline feed is separated into a lighter hydrocarbon fraction withdrawn from distillation columns 24 and 28 via conduit means 29 and 30, respectively. A residual hydrocarbon fraction is withdrawn from distillation columns 24 and 28 via conduit means 31 and 32, respectively.

Having described the process flow, the inventive control system will now be described. The rate of flow of liquid hydrocarbon from feed storage vessel 12 to hydrodesulfurization zone 17 via conduit means 16 is maintained substantially constant. A conventional flow recorder-controller 33 opens and closes valve 34 responsive to a set point representative of the desired rate of liquid flow and a measurement representative of the actual liquid rate of flow in conduit 16.

As the liquid level in feed storage vessel 12 increases or decreases as determined by a conventional liquid level controller 36, liquid level controller 36 transmits signals to valve 37 and valve 38 manipulating the flow of liquid through conduit 39 and conduit 11, respectively, responsive to the liquid level in feed storage vessel 12. For example, as the liquid level rises in feed storage vessel 12, liquid level controller 36 transmits a signal causing valve 37 to open, thereby passing at least a portion of the feed material via conduit means 10, conduit means 39, and conduit means 13 to a by-pass storage vessel 40. If the liquid level in feed storage vessel 12 continues to rise, the signal transmitted by liquid level controller 36 will cause valve 38 to be closed so as to maintain a desired maximum liquid level in feed storage vessel 12.

It is within the scope of the invention to measure a process variable of the liquid flowing through conduit 14 representative of the pressure of said liquid and to manipulate the flow of liquid through valve 41 to by-pass storage vessel 40 responsive thereto. As illustrated, a conventional pressure recorder-controller 42 opens and closes valve 41 responsive to the pressure in conduit 14 and the set point of controller 42. By operating in this manner, the pressure of feed in conduit means 14 and conduit means 10 can be maintained substantially constant. It is within the scope of this invention to withdraw the liquid stored within by-pass storage vessel 40 via conduit means 43 and to pass the withdrawn liquid via conduit means 43 and conduit means 11 to feed storage vessel 12. The rate of liquid flow through conduit means 43 is manipulated by a conventional flow recorder-controller 46 opening and closing valve 47 responsive to a set point and a rate of flow measurement in conduit 43.

By my invention, I have provided a control system wherein the liquid level within feed storage vessel 12 is maintained at or below a desired maximum with a variable hydrocarbon feed rate of flow through conduit 10.

The liquid level within distillation column 19 is determined by a conventional liquid level controller 48. Liquid level controller 48 transmits a signal to a conventional flow recorder-controller 49 as a set point signal. Flow recorder-controller 49 opens and closes valve 50 responsive to the set point signal received from liquid level controller 48 and a rate of flow measurement in conduit 22. The rate of flow of liquid through valve 50 to distillation column 24 and feed storage vessel 23 has a maximum limit. For example, assuming that the signal transmitted by liquid level controller 48 is a pneumatic signal in a range from 3 to 15 p.s.i. with a higher signal pressure representative of a higher liquid level in distillation column 19, then as the pressure signal transmitted from liquid level controller 48 to flow recorder-controller 49 increases from 3 to 9 p.s.i., for example, valve 50 is opened to its predetermined maximum open position. With a further increase in the liquid level in distillation column 19, and the resultant signal transmission by liquid level controller 48 of a pressure above 9 p.s.i., valve 51 is opened, thereby recycling a portion of the liquid withdrawn from distillation column 19 via conduit means 21 and cooled via heat exchange 52 to feed storage vessel 12 via conduit means 44 and conduit means 11. Should valve 38 be in the closed position responsive to a signal transmitted by liquid level controller 36, the recycled liquid passing through conduit 44 is passed via conduit means 10, conduit means 39 and conduit means 13 to by-pass storage vessel 40.

The rate of flow of liquid through conduit 22 to feed storage vessel 23 is controlled by a conventional pressure recorder-controller 53 opening and closing valve 54 responsive to a pressure measurement in conduit 22 and a set point signal hereinafter described. The liquid level within feed storage vessel 23 is determined by a conventional liquid level controller 56 and a signal responsive to the liquid level within feed storage vessel 23 is transmitted to pressure recorder-controller 53 and flow recorder-controller 57 as set point signals. Flow recorder-controller 57 opens and closes valve 58 responsive to a rate of flow measurement in conduit 27 and a set point signal transmitted by liquid level controller 56. Liquid level controller 56 thus operates to maintain the desired liquid level within feed storage vessel 23.

The flow of liquid hydrocarbon through conduit 26 to distillation column 24 is controlled and maintained substantially constant by a conventional flow recorder-controller 61 opening and closing valve 60 responsive to a predetermined set point and a rate of flow measurement in conduit 26.

An advantage of the inventive control system as applied to the hydrodesulfurization process is that it provides a maximum constant feed to the hydrodesulfurization zone 17 with a variable feed flow rate to vessel 12 via conduit 11, and with variable feed rates of flow in conduits 10 and 13. An additional advantage of the inventive control system is that with the feed capacity to distillation columns 24 and 28 limited, by recycling a portion of the liquid withdrawn from column 19, required surge capacity of storage vessel 23 is minimized.

As will be evident to those skilled in the art, various modifications of this invention can be made, or followed, in the light of the foregoing disclosure, without departing from the spirit or scope thereof.

I claim:

1. In a process which comprises passing a liquid feed stream from a source of liquid feed to a first storage zone as part of the feed to said first storage zone, passing a liquid from said first storage zone to a reaction zone, passing an effluent from said reaction zone to a first distillation zone, withdrawing from said first distillation zone a vaporous fraction, and withdrawing from said first distillation zone a liquid fraction; a method of control which comprises dividing said liquid fraction into first and second liquid fractions, manipulating the rate of flow of each of said first and second liquid fractions responsive to a liquid level in said first distillation zone, passing said second liquid fraction to said first storage zone as a part of the feed to said first storage zone, passing a portion of said liquid feed to a second storage zone, manipulating the total flow rate of feed to said first storage zone responsive to a liquid level in said first storage zone, manipulating the flow rate of said portion of said liquid feed to said second storage zone responsive to a liquid level in said first storage zone, and withdrawing liquid from said second storage zone.

2. The method of control of claim 1 to include maintaining the rate of flow of liquid from said first storage zone to said reaction zone substantially constant.

3. The method of control of claim 2 wherein said liquid feed comprises a liquid hydrocarbon and said reaction zone comprises a hydrodesulfurization zone.

4. A process in accordance with claim 1 further comprising passing a first portion of said first liquid fraction from said first distillation zone to a second distillation zone as feed therefor, removing an overhead product stream and a kettle product stream from said second distillation zone, passing a second portion of said first liquid fraction from said first distillation zone to a third storage zone, passing liquid from said third storage zone to a third distillation zone, removing an overhead product stream and a kettle product stream from said third distillation zone, maintaining the rate of flow of said first portion of said first liquid fraction to said second distillation zone substantially constant, manipulating the flow of liquid to said third storage zone and the rate of flow of liquid from said third storage zone to said third distillation zone responsive to a liquid level in said third storage zone.

5. A process in accordance with claim 4 wherein said liquid feed stream from a source of liquid feed comprises first and second liquid feed streams from first and second sources of liquid feed, respectively, and further comprising measuring a property of said second liquid feed stream representative of the pressure thereof, and passing a portion of said second liquid feed stream to said second storage zone responsive to the thus measured property.

6. A process comprising passing a liquid feed stream into a first storage zone, passing a liquid stream from said first storage zone to a reaction zone, passing an effluent stream from said reaction zone to a first distillation zone, withdrawing an overhead product from said first distillation zone, withdrawing a kettle stream from said first distillation zone, passing at a flow rate responsive to a liquid level in said first distillation zone a first portion of said kettle stream from said first distillation zone to further distillation processing, passing at a flow rate responsive to a liquid level in said first distillation zone a second portion of said kettle stream from said first distillation zone to said first storage zone as a part of the feed to said first storage zone.

7. A process in accordance with claim 6 wherein a control signal is established responsive to a liquid level in said first distillation zone, and wherein the flow rate of said first portion of said kettle stream is varied responsive to variations within a first range of said control signal and the flow rate of said second portion of said kettle stream is varied responsive to variations within a second range of said control signal.

8. A process in accordance with claim 7 wherein said further processing comprises passing a first fraction of said first portion to a second distillation zone at a substantially constant flow rate, passing a second fraction of said first portion to a second storage zone at a rate responsive to the pressure of said first portion, passing a liquid stream from said second storage zone to a third distillation zone at a flow rate responsive to a liquid level in said second storage zone, modifying the control of the flow rate of said second fraction to said second storage zone responsive to a liquid level in said second storage zone, and withdrawing overhead product streams and kettle product streams from said second and third distillation zones.

9. In apparatus which comprises a first storage tank, first conduit means for passing a liquid feed to said first storage tank, a reactor, second conduit means for passing the liquid from said first storage tank to said reactor, a first distillation column, third conduit means for passing an effluent from said reactor to said first distillation column, fourth conduit means for withdrawing from said first distillation column a vaporous fraction, and fifth conduit means for withdrawing from said first distillation column a liquid fraction; control apparatus comprising means for measuring a liquid level in said first storage tank, a by-pass storage tank, sixth conduit means communicating between said first conduit means and said by-pass storage tank, means for manipulating the rate of flow of liquid feed through said sixth conduit means to said by-pass storage tank and the rate of flow of liquid feed to said first storage tank responsive to said liquid level measurement, means for measuring the liquid level in said first distillation column, means for manipulating the rate of withdrawal of liquid from said first distillation column responsive to said distillation column liquid level measurement, seventh conduit means communicating between said fifth conduit means and said first conduit means, means for manipulating the rate of flow of liquid through said seventh conduit means from said first distillation column to said first conduit means responsive to said liquid level measurement in said first distillation column, and a withdrawal conduit connected to said by-pass storage tank.

10. The apparatus of claim 9 including means for maintaining the rate of flow of liquid from said first storage tank through said second conduit means to said reactor substantially constant.

11. In apparatus which comprises a first storage tank, a by-pass storage tank, first conduit means for passing a liquid feed to said first storage tank, second conduit means for passing a portion of said liquid feed to said by-pass storage tank, a withdrawal conduit connected to said by-pass storage tank, a reactor, third conduit means for passing a liquid from said first storage tank to said reactor, a first distillation column, fourth conduit means for passing an effluent from said reactor to said first distillation column, fifth conduit means for withdrawing a vaporous fraction from said first distillation column, a second distillation column, sixth conduit means for passing a liquid fraction from said first distillation column to said second distillation column, a second storage tank, seventh conduit means for passing a liquid fraction from said first distillation column to said second storage tank, a third distillation column, and eighth conduit means for passing a liquid from said second storage tank to said third distillation column, ninth conduit means communicating between the kettle of said first distillation column and said first conduit means; control apparatus comprising means for measuring a liquid level within said first storage tank, means for manipulating the rate of flow of liquid through said first conduit means to said first storage tank and through said second conduit means to said by-pass storage tank responsive to said liquid level measurement, means for measuring a liquid level within said first distillation column, means for manipulating the rate of flow of liquid from said first distillation column through said sixth conduit means to said second distillation column, means for manipulating the rate of flow of liquid from said first distillation column through said ninth conduit means to said first conduit means responsive to said liquid level measurement in said first distillation column, means for measuring a liquid level in said second storage tank, means for manipulating the rate of flow of liquid through said seventh conduit means to said second storage tank and the rate of flow of liquid from said second storage tank through said eighth conduit means to said third distillation column responsive to said second storage tank liquid level measurement, and means for withdrawing overhead products and kettle products from said second and third distillation columns.

12. The apparatus of claim 11 wherein said means for manipulating the rate of flow of liquid through said seventh conduit means to said second storage tank comprises means for measuring the pressure of said liquid passing to said second storage tank, and means for manipulating the rate of flow of liquid through said seventh conduit means to said second storage tank responsive to said pressure measurement and said second storage tank liquid level measurement.

References Cited
UNITED STATES PATENTS

| 3,150,197 | 9/1964 | Smith | 208—95 |
| 3,211,536 | 10/1964 | Van Pool | 260—683.48 |

SAMUEL P. JONES, *Primary Examiner.*

DELBERT E. GANTZ, *Examiner.*